United States Patent Office 2,783,254
Patented Feb. 26, 1957

2,783,254
PROCESS FOR THE MANUFACTURE OF 17α-HYDROXYCORTICOSTERONE AND INTERMEDIATES OBTAINED THEREBY

David H. Gould, Leonia, and Eugene P. Oliveto, Bloomfield, N. J., assignors to Schering Corporation, Bloomfield, N. J., a corporation of New Jersey No Drawing. Application September 8, 1952,
Serial No. 308,502

5 Claims. (Cl. 260—397.45)

Our invention relates to a process for the manufacture of 17α-hydroxycorticosterone (Kendall's Compound F), and to certain intermediates obtained thereby and to the process involved in their manufacture.

According to the present invention, normal and allopregnan-3,11β,17α-triol-20-ones (I) (which may be prepared as described in the copending application of Eugene P. Oliveto, David H. Gould, and Temple Clayton, Serial No. 291,781, filed June 4, 1952, by hydrogenating, for example, pregnan-3α,17α-diol-11,20-dione 20-ethylene ketal in glacial acetic acid at room temperature and atmospheric pressure with pre-reduced Adams platinum oxide catalyst until one equivalent of hydrogen is absorbed, followed by concentration in vacuo and hydrolysis of the resulting oil with aqueous KOH under reflux) are first subjected to a series of reactions, described more fully hereinbelow, resulting in the production of normal and allopregnan-11β,17α21-triol-3,20-diones and their 21-functional derivatives (IV). The latter compounds are then converted into 21-substituted 17α-hydroxycorticosterone (IX, Compound F) by different routes depending on their A–B ring configuration.

In carrying out our process, compound I is first converted into its 21-halogeno derivative, as by treatment with bromine or iodine, preferably the former, to yield compound II. The 21-halogenated compound is then converted into a 21-ether or ester as by treatment with an alkali metal alcoholate or salt of an organic acid, preferably an organic carboxylic acid. Suitable reagents for the purpose are sodium and potassium methylate, ethylate, isopropylate, butylate, benzylalcoholate, acetate, propionate, valerate, benzoate, and the like. The compound produced is indicated at III hereinbelow. This compound is then subjected to a limited oxidation, as by way of the Oppenauer reaction to replace the 3-secondary hydroxyl group with a keto group, thereby yielding compound IV.

These reactions are indicated by the following equations:

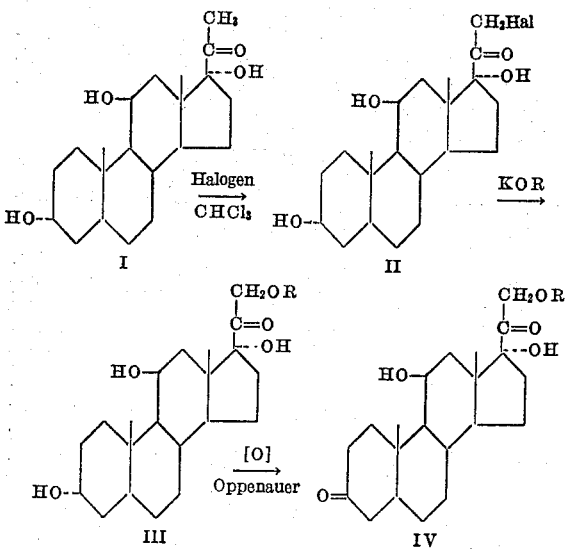

In these formulae, halogen or Hal stands for bromine or iodine, preferably the former; while R stands for an alkyl, aralkyl, acyl, or aroyl group. Compound III can be hydrolyzed, as with sodium or potassium hydroxides or carbonates to yield a free 21-hydroxyl, in which case R can also be hydrogen. However, it is preferred to employ the 21-functional derivative in the oxidation reaction and the resulting product, IV, can be hydrolyzed as just described to the 21-hydroxyl compound.

The reactions just described apply to both the normal and 3α-hydroxy-pregnane and 3β-hydroxy-allopregnane compounds. The specific procedure for converting compound IV into IX (21-OR derivative of Compound F) will depend upon the configuration of the A–B rings. For the normal compound IV the reactions include treatment with a halogen, such as bromine, or iodine, to produce the 4-halogeno compound, which is then dehydrohalogenated in known manner to produce compound IX in accordance with the following equation:

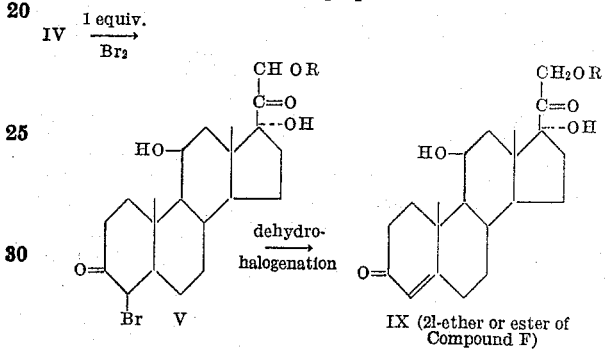

In the case of the allo-series, compound IV is first treated with halogen, preferably bromine, to yield the 2,4-dihalogeno compound VI. The latter is then treated with sodium iodide to produce the 2-iodo-4-bromo compound as shown at VII. Heating of VII with a high-boiling organic base, preferably one boiling higher than pyridine, such as collidine, lutidine, quinoline, and the like, effects dehalogenation and dehydrohalogenation to yield compound IX, as shown in the following equations:

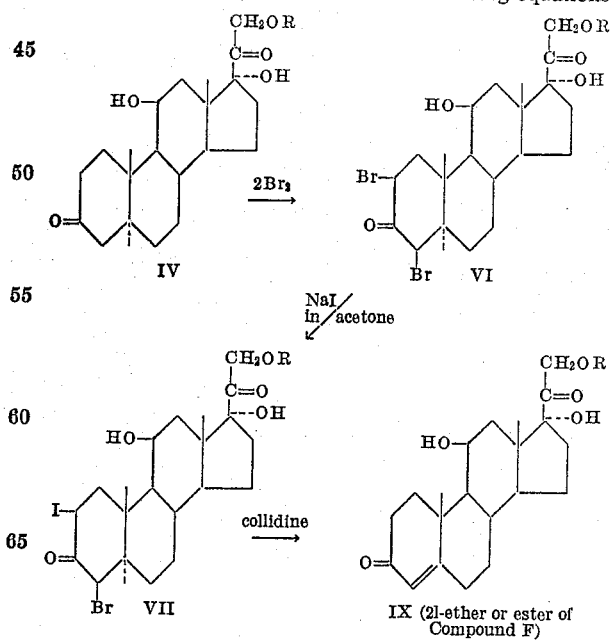

The conversion of VI to IX can also be effected by first heating compound VI with sodium iodide in acetone under reflux for a considerable length of time, there being produced 2-iodo-$\Delta^4$-pregnen-11$\beta$,17$\alpha$,21-triol-3,20-dione 21-acetate (or other 21-functional derivative), the latter compound being then heated with a high boiling organic base like collidine to yield $\Delta^4$-pregnen-11$\beta$,17$\alpha$,21-triol-3,20-dione 21-acetate (IX), or other 21-functional derivative.

Compounds IV and IX can be conveniently converted to the 21-hydroxy compounds by treatment, for example, in the case of the esters, with sodium or potassium bicarbonate in methanol, preferably in a non-oxidizing atmosphere like nitrogen.

Specific procedures for the manufacture of the above described compounds are set forth in the following examples which are, however, presented only for purposes of illustration, and not as indicating the scope of the invention, such scope being defined in the appended claims.

EXAMPLE 1

20-keto-3$\alpha$,11$\beta$,17$\alpha$,21-pregnantetrol-21-acetate

Ten ml. of C. P. chloroform are saturated with dry HBr at room temperature, a solution of 1.0 g. 20-keto-3$\alpha$,11$\beta$,17$\alpha$-pregnantriol in 15 cc. C. P. chloroform is added and the mixture is cooled to 0° C. Stirring is initiated. A solution of 480 mg. of bromine in 10 cc. chloroform is added over a period of 20 min. with mechanical stirring. During the addition, the temperature is maintained at 3–5° C. About ½ of the chloroform is then removed in vacuo. The evaporation product, 21-bromo-pregnan-3$\alpha$,11$\beta$,17$\alpha$-triol-20-one, may be carefully crystallized from methanol.

Three g. of anhydrous potassium acetate and 45 cc. of C. P. acetone are added to the residue. After refluxing for 4 hrs., about two-thirds of the acetone is distilled off, chloroform and water are added, and the organic layer is washed twice with water. After drying, the chloroform is removed in vacuo. The residue is crystallized from ethyl acetate to give 21-acetoxypregnan-3$\alpha$,11$\beta$,17$\alpha$-triol-20-one, M. P. 221–223° C.

EXAMPLE 2

21-acetoxypregnan-11$\beta$,17$\alpha$-diol-3,20-dione

A solution of 2.0 g. of 21-acetoxypregnan-3$\alpha$,11$\beta$,17$\alpha$-triol-20-one in 50 cc. benzene is distilled to remove water. To this solution is added 5 g. aluminum phenoxide and 50 cc. dry acetone, and the mixture is refluxed for 24 hours. A saturated solution of Rochelle salt is added to remove aluminum salts, and the benzene solution is washed repeatedly with sodium carbonate solution. Removal of the solvent yields 21-acetoxypregnan-11$\beta$,17$\alpha$-diol-3,20-dione, M. P. 218–220°.

EXAMPLE 3

4-bromo-21-acetoxypregnan-11$\beta$,17$\alpha$-diol-3,20-dione

Two and one-half cubic centimeters of methylene chloride are saturated with hydrogen bromide at room temperature. A mixture of 406 mg. of 21-acetoxy-pregnan-11$\beta$,17$\alpha$-diol-3,20-dione and 2.5 cc. of t-butanol is added, and the whole is cooled to 0°. A solution of 160 mg. of bromine in 1 cc. of methylene chloride and 1 cc. of t-butanol is added at such a rate as to maintain the temperature at 0°. The solution is then allowed to warm up to room temperature. During this time the last trace of red color disappears. The solution is evaporated in vacuo until crystals begin to appear. Water is then added, and the precipitate is filtered and dried at 40°. The crude 4-bromo-21-acetoxypregnan-11$\beta$,17$\alpha$-diol-3,20-dione is purified by crystallization from aqueous acetone.

EXAMPLE 4

17$\alpha$-hydroxycorticosterone

A mixture of 485 mg. of 4-bromo-21-acetoxypregnan-11$\beta$,17$\alpha$-diol-3,20-dione, 100 mg. of sodium acetate, 140 mg. of semicarbazide hydrochloride and 10 cc. of acetic acid is allowed to stand at room temperature for 15 min. under an atmosphere of carbon dioxide; 1.1 ml. of 1 N sodium acetate in acetic acid is added, and the mixture is allowed to stand for ½ to 1 hr. until it becomes homogeneous. The solution is then concentrated in vacuo to about 2–3 ml., then 250 mg. of sodium acetate, 285 mg. of 93% pyruvic acid, and 0.8 ml. of water are added at the boiling point until crystals appear. After cooling, the crude 17$\alpha$-hydroxycorticosterone 21-acetate, is collected. Upon crystallization from methanol, it melted at 219–0–219.8°, $[\alpha]_D$ +152°.

By treatment with 10 volumes of aqueous methanolic sodium bicarbonate at 40° C. for 3 hrs., there is obtained after precipitation with excess water, 17$\alpha$-hydroxycorticosterone, M. P. 218–220°.

EXAMPLE 5

Allopregnan-3$\beta$,11$\beta$,17$\alpha$,21-tetrol-20-one-21-acetate

Chloroform (15 ml. C. P.) is saturated with gaseous HBr at room temperature and a solution of 1.5 g. of allopregnan-3$\beta$,11$\beta$,17$\alpha$-triol-20-one in 30 ml. of C. P. chloroform is added. The solution is chilled to 0° with stirring, and a solution of 720 mg. of Br$_2$ in 10 ml. of chloroform (C. P.) is added dropwise over 20 minutes. The temperature is held below 5° by an ice bath. The product obtained on evaporation, 21-bromo-allopregnan-3$\beta$,11$\beta$,17$\alpha$-triol-20-one, may be recrystallized from methanol.

The solution of crude 21-bromo-allopregnantriolone is concentrated to 25 ml. in vacuo. To this is added 5 g. of anhydrous potassium acetate and 60 ml. of C. P. acetone. The mixture is refluxed for 4 hrs. and concentrated to 25–30 ml. Chloroform is added and the mixture is washed twice with water. The chloroform solution is dried over MgSO$_4$ and evaporated in vacuo. The residue is crystallized from isopropanol to give allopregnan-3$\beta$,11$\beta$,17$\alpha$,21-tetrol-20-one-21-acetate.

EXAMPLE 6

Allopregnan-11$\beta$,17$\alpha$,21-triol-3,20-dione-21-acetate

Allopregnantetrolone acetate (1.0 g.), prepared as in Example 5, is dissolved in 40 ml. of benzene with 10 ml. of cyclohexanone and 5 ml. of solvent is distilled off to remove water. To the solution is added 1 g. of aluminum t-butylate in 10 ml. of benzene and the mixture is refluxed for four hrs. A saturated solution of Rochelle salt is added and the organic layer is steam distilled to remove excess cyclohexanone. The precipitated product is taken up in benzene, washed with dilute sulfuric acid and then water, and dried over magnesiumsulfate. The dried solution is evaporated to give the product, allopregnan - 11$\beta$,17$\alpha$,21 - triol - 3,20 - dione - 21-acetate, which may be recrystallized from acetone, M. P. 209–212° C.

EXAMPLE 7

2,4 - dibromo - allopregnan - 11$\beta$,17$\alpha$,21 - triol - 3,20-dione-21-acetate A sample of 0.5 g. of allopregnan-11$\beta$,17$\alpha$,21-triol-3,20-dione-21-acetate is dissolved in 10 ml. of glacial acetic acid and cooled to 18°. One drop of glacial acetic acid saturated with hydrogen bromide is added followed by a solution of 0.44 g. of bromine in 2 ml. of acetic acid. The mixture is stirred well. The temperature rises to and then is held at 25°. After the color decreases, the solution is held at room temperature for five hrs. After a short time, the product, 2,4-dibromo-allopregnan-11$\beta$,17$\alpha$,21-triol-3,20-dione-21-acetate, starts to crystallize out. It is filtered off, washed with a little cold methanol and dried in vacuo.

EXAMPLE 8

*2-iodo-4-bromo-allopregnan-11β,17α,21-triol-3,20-dione-21-acetate*

A sample of 1 g. of the dibromo-allopregnan-triol-dione acetate of Example 7 is dissolved in 40 ml. of acetone containing 1 g. of sodium iodide. The mixture is refluxed in a nitrogen atmosphere for 45 min. and cooled rapidly. The product is obtained by addition of thiosulfate solution to discharge the color, and water. It may be recrystallized carefully from acetone, M. P. ca. 135° with decomposition.

EXAMPLE 9

*2-iodo-Δ⁴-pregnen-11β,17α,21-triol-3,20-dione-21-acetate*

A sample of 0.5 g. of the iodo-bromo-allopregnan-trioldione acetate of Example 8 in 20 ml. of acetone is treated with 0.25 g. of sodium-iodide and refluxed for 8 hrs. Addition of thiosulfate solution and water give the desired iodopregnene, crystallizable from acetone-methanol.

EXAMPLE 10

*2-iodo-Δ⁴-pregnen-11β,17α,21-triol-3,20-dione-21-acetate*

A sample of 0.5 g. of dibromoallopregnantrioldione acetate of Example 7 is dissolved in 25 ml. of acetone and 0.8 g. of sodium iodide is added. The mixture is refluxed for 20 hrs. It is then filtered to remove sodium bromide, and concentrated to 10 ml. The iodine color is discharged by addition of sufficient thiosulfate solution. The solution is then poured into water and the precipitate is collected and washed with water. The product, 2-iodo-4-pregnen-11β,17α,21-triol-3,20-dione-21-lactate (2-iodo-17α-hydroxy-corticosterone acetate) is crystallized carefully from acetone-methanol.

EXAMPLE 11

*Δ⁴-pregnen-11β,17α,21-triol-3,20-dione-21-acetate*

A sample of 0.2 g. of the iodo ketone of Example 10 is refluxed 30 min. in 5 ml. of collidine. The dark mixture is poured into dilute acid and extracted with ether. The dried ether solution is evaporated and the residue is chromatographed from benzene on ethyl acetate-washed alumina. The eluate is evaporated and the residue crystallized from ethyl acetate to give 4-pregnen-11β,17α,21-triol-3,20-dione-21-acetate (IX, 17α-hydroxycorticosterone acetate, Kendall's Compound F acetate), M. P. 217–219.5°.

EXAMPLE 12

*Δ⁴-pregnen-11β,17α,21-triol-3,20-dione-21-acetate*

A sample of 0.3 g. of the iodo-bromoallopregnan of Example 8 is treated with 5 ml. of refined 2,4,6-collidine and refluxed for 20 min. The mixture is poured into dilute hydrochloric acid and extracted with methylene chloride. After being washed neutral, the solution is dried and evaporated. The residue is chromatographed from ether on magnesium silicate and the product, 17α-hydroxycorticosterone acetate, is recrystallized from ethyl acetate, M. P. 218–219° C.

EXAMPLE 13

*Δ⁴-pregnen-11β,17α,21-triol-3,20-dione*

The acetate of Example 11 or 12 is saponified by stirring overnight under $N_2$ with 1.05 equivalents of sodium bicarbonate in aqueous methanol at room temperature. The mixture is concentrated in vacuo and diluted with water to obtain 17α-hydroxycorticoscterone, M. P. 218–220°.

EXAMPLE 14

*Pregnan-3α,11β,17α,21-tetrol-20-one*

The acetate of Example 1 is saponified by refluxing with 1.1 equivalents of potassium bicarbonate in aqueous methanol for 30 min. under nitrogen. The mixture is worked up as in Example 13 to give pregnan-3α,11β,17α,21-tetrol-20-one.

We claim:

1. Process for the manufacture of allopregnan-11β,17α,-21-triol-3,20-dione and its 21-esters, comprising halogenating allopregnan-3β,11β,17α-triol-20-one to produce the 21-halogeno derivative, reacting the latter with a metal salt of an organic carboxylic acid, to replace the halogen with an ester group, and selectively oxidizing the 3-secondary hydroxyl to a keto group.

2. A saturated allopregnan-11β,17α,21-triol-3,20-dione-21-ester of a lower alkanoic acid.

3. Allopregnan - 11β,17α,21-triol - 3,20 - dione - 21 - acetate.

4. The process which comprises brominating allopregnan-3β,11β,17α-triol-20-one to produce the 21-bromo derivative, substituting the 21-bromo group with the acyloxy group of an organic carboxylic acid, and selectively oxidizing the 3-hydroxyl group to a keto group to produce the 21-ester of allopregnan-11β,17α,21-triol-3,20-dione.

5. Process according to claim 4, wherein the 21-bromo compound is reacted with potassium acetate to form the 21-acetate.

References Cited in the file of this patent

UNITED STATES PATENTS

| | | |
|---|---|---|
| 2,312,483 | Reichstein | Mar. 2, 1943 |
| 2,359,772 | Marker | Oct. 10, 1944 |
| 2,401,775 | Reichstein | June 11, 1946 |
| 2,409,043 | Inhoffen | Oct. 8, 1946 |
| 2,596,562 | Kaufmann | May 13, 1952 |
| 2,596,563 | Kaufmann | May 13, 1952 |

OTHER REFERENCES

Fieser et al.: Natural Products Related to Phenanthrene, 3rd ed., pp. 425–26 (1949).